United States Patent
Gordon et al.

(10) Patent No.: US 9,188,443 B2
(45) Date of Patent: Nov. 17, 2015

(54) VENDING MODIFIED CLIMATE CONTROL DEVICE

(75) Inventors: Michael Gordon, Warren, NJ (US); J. Henry Scott, Warren, NJ (US)

(73) Assignee: Innovaci Inc., New Brunswick, NJ (US)

( * ) Notice: Subject to any disclaimer, the term of this patent is extended or adjusted under 35 U.S.C. 154(b) by 56 days.

(21) Appl. No.: 13/306,296

(22) Filed: Nov. 29, 2011

(65) Prior Publication Data

US 2012/0143750 A1 Jun. 7, 2012

Related U.S. Application Data

(60) Provisional application No. 61/418,674, filed on Dec. 1, 2010.

(51) Int. Cl.

| | |
|---|---|
| *G06Q 20/10* | (2012.01) |
| *G01C 19/5698* | (2012.01) |
| *G06Q 20/14* | (2012.01) |
| *G07C 3/00* | (2006.01) |
| *G07F 9/10* | (2006.01) |
| *G07F 15/04* | (2006.01) |
| *G07F 19/00* | (2006.01) |

(52) U.S. Cl.
CPC ............ *G01C 19/5698* (2013.01); *G06Q 20/10* (2013.01); *G06Q 20/102* (2013.01); *G06Q 20/145* (2013.01); *G07C 3/00* (2013.01); *G07F 9/105* (2013.01); *G07F 15/04* (2013.01); *G07F 19/201* (2013.01)

(58) Field of Classification Search
CPC ..................................................... G06Q 20/10
USPC .......................................................... 705/40
See application file for complete search history.

(56) References Cited

U.S. PATENT DOCUMENTS

| | | | |
|---|---|---|---|
| 3,292,821 A | 12/1966 | Cowley | |
| 3,651,466 A | 3/1972 | Galpin | |
| 5,339,250 A | 8/1994 | Durbin | |
| 5,619,024 A | 4/1997 | Kolls | |
| 5,859,778 A | 1/1999 | Kuroda et al. | |
| 5,890,520 A | 4/1999 | Johnson, Jr. | |
| 5,895,457 A | 4/1999 | Kurowski et al. | |
| 5,971,273 A * | 10/1999 | Vallaire | 235/381 |
| 6,038,491 A | 3/2000 | McGarry et al. | |

(Continued)

FOREIGN PATENT DOCUMENTS

| | | | | |
|---|---|---|---|---|
| JP | 2003203111 | * | 7/2003 | ............. G06F 17/60 |
| JP | 2003203111 | | 8/2003 | |

(Continued)

OTHER PUBLICATIONS

Search Report from PCT Patent Appln. No. PCT/US2012/049596 filed Aug. 3, 2012; pp. 1-4.

(Continued)

*Primary Examiner* — Lindsay M Maguire
(74) *Attorney, Agent, or Firm* — Chiesa Shahinian & Giantomasi PC

(57) ABSTRACT

A user input comprising a climate control parameter is received. A climate control subsystem that is configured to modify an environment based on the climate control parameter is activated. A payment message that is based on a usage parameter is transmitted to a billing system. The payment message results in a charge being made to an account of the user.

15 Claims, 11 Drawing Sheets

(56) References Cited

U.S. PATENT DOCUMENTS

| | | |
|---|---|---|
| 6,061,668 A | 5/2000 | Sharrow |
| 6,123,223 A | 9/2000 | Watkins |
| 6,230,150 B1 | 5/2001 | Walker et al. |
| 6,330,490 B1 | 12/2001 | Kim et al. |
| 6,457,038 B1 | 9/2002 | Defosse |
| 6,466,920 B1 | 10/2002 | Okayama et al. |
| 6,539,570 B2 | 4/2003 | Youn et al. |
| 6,917,279 B1 | 7/2005 | Thomas et al. |
| 7,079,922 B2 | 7/2006 | Komai |
| 7,081,830 B2 * | 7/2006 | Shimba et al. ............. 340/12.31 |
| 7,253,729 B2 | 8/2007 | Lastinger et al. |
| 7,295,099 B2 | 11/2007 | Lee et al. |
| 7,529,597 B1 | 5/2009 | Hertz et al. |
| 7,552,094 B2 | 6/2009 | Park et al. |
| 7,734,371 B2 | 6/2010 | Garneau, III |
| 8,145,357 B2 | 3/2012 | Nibler et al. |
| 2001/0020198 A1 | 9/2001 | Wilson |
| 2001/0034566 A1 | 10/2001 | Offer |
| 2002/0016829 A1 | 2/2002 | Defosse |
| 2002/0026366 A1 | 2/2002 | Ohtsuki et al. |
| 2002/0032491 A1 | 3/2002 | Imamura et al. |
| 2002/0128853 A1 | 9/2002 | Kikuchi et al. |
| 2002/0165787 A1 | 11/2002 | Bates et al. |
| 2002/0194137 A1 | 12/2002 | Park et al. |
| 2003/0014369 A1 | 1/2003 | Okayama et al. |
| 2003/0033243 A1 | 2/2003 | Baker et al. |
| 2003/0154170 A1 | 8/2003 | Komai |
| 2003/0155417 A1 | 8/2003 | Fairman |
| 2004/0044438 A1 | 3/2004 | Lorraine et al. |
| 2004/0054601 A1 | 3/2004 | Carapelli |
| 2004/0206814 A1 | 10/2004 | Kawai et al. |
| 2004/0225516 A1 | 11/2004 | Bruskotter et al. |
| 2005/0010223 A1 | 1/2005 | Gotfried |
| 2005/0119765 A1 | 6/2005 | Bergman et al. |
| 2006/0013234 A1 | 1/2006 | Thomas et al. |
| 2006/0111816 A1 | 5/2006 | Spalink et al. |
| 2007/0093934 A1 | 4/2007 | Garneau, III |
| 2007/0251461 A1 | 11/2007 | Reichard et al. |
| 2008/0015873 A1 | 1/2008 | Shostack et al. |
| 2008/0183752 A1 | 7/2008 | Jain |
| 2009/0210096 A1 | 8/2009 | Stack et al. |
| 2011/0183733 A1 * | 7/2011 | Yoshida et al. ................... 463/1 |
| 2011/0196547 A1 | 8/2011 | Park et al. |
| 2011/0254697 A1 | 10/2011 | Casey et al. |
| 2012/0066023 A1 * | 3/2012 | Xia et al. ..................... 705/7.29 |

FOREIGN PATENT DOCUMENTS

| | | |
|---|---|---|
| JP | 2004213218 A | 7/2004 |
| WO | 2006013905 | 2/2006 |
| WO | 2006055334 A1 | 5/2006 |

OTHER PUBLICATIONS

Written Opinion from PCT Patent Appln. No. PCT/US2012-049596 filed Aug. 3, 2012; pp. 1-9.

International Search Report from PCT/US2011/062448; dated Mar. 2, 2012; pp. 1-3.

Written Opinion of the International Searching Authority from PCT/US2011/062448; dated Mar. 2, 2012; pp. 1-4.

Notification of Results of Checking Patentability mailed on Jul. 17, 2014, in connection with Russian Patent Application No. 2013125461, 9 pgs.

Notification of Reasons for Refusal issued on Jul. 15, 2014, for corresponding Japanese patent application No. 2013-542110, 4 pgs.

Office Action dated Mar. 19, 2015, in connection with Chinese Patent Application No. 201180057797.3, 15 pgs.

* cited by examiner

Fig. 6

250 Maintenance and Monitoring Module

- 610 Device Order Database Subsystem
- 611 Troubleshooting Diagnostics Subsystem
- 612 Performance Subsystem
- 613 Data Management and Reporting Subsystem
- 614 User Interface Subsystem
- 615 Networking Subsystem
- 616 Fan Performance Subsystem
- 617 Electronic Operating Logs Subsystem
- 618 Monitoring Subsystem
- 619 Climate Control Subsystem

Fig. 9

Remote Monitor 170

Network Interface
910

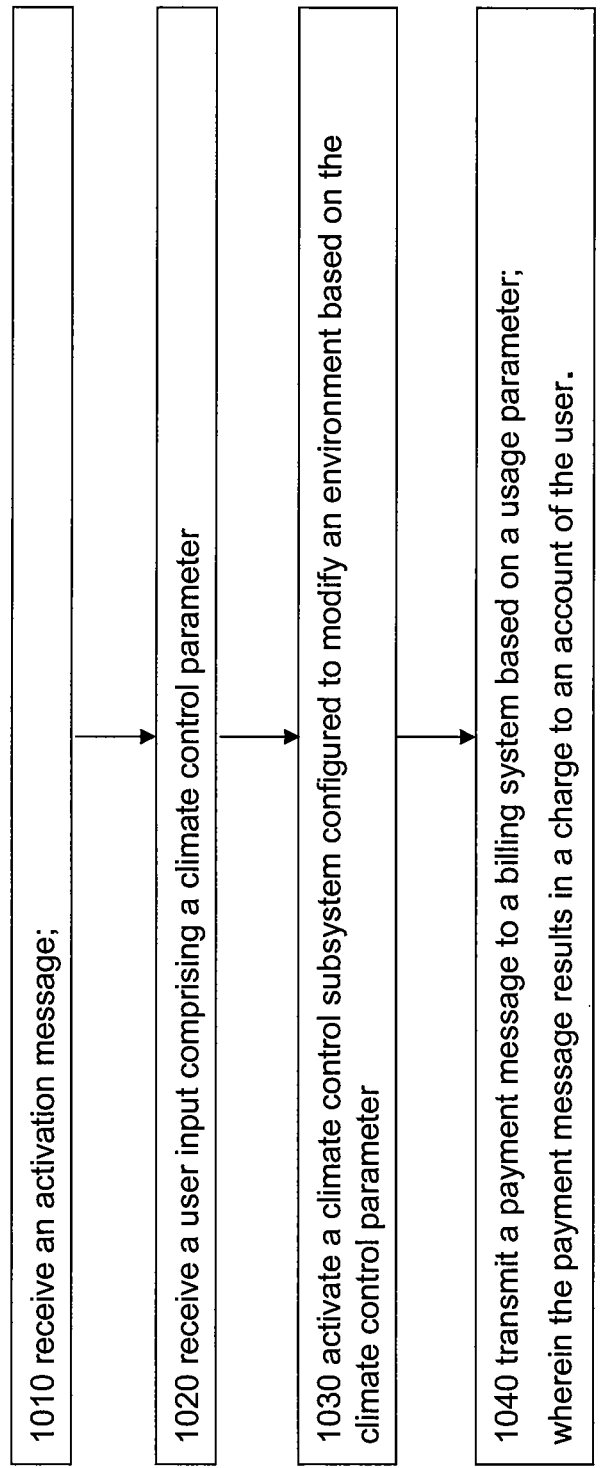

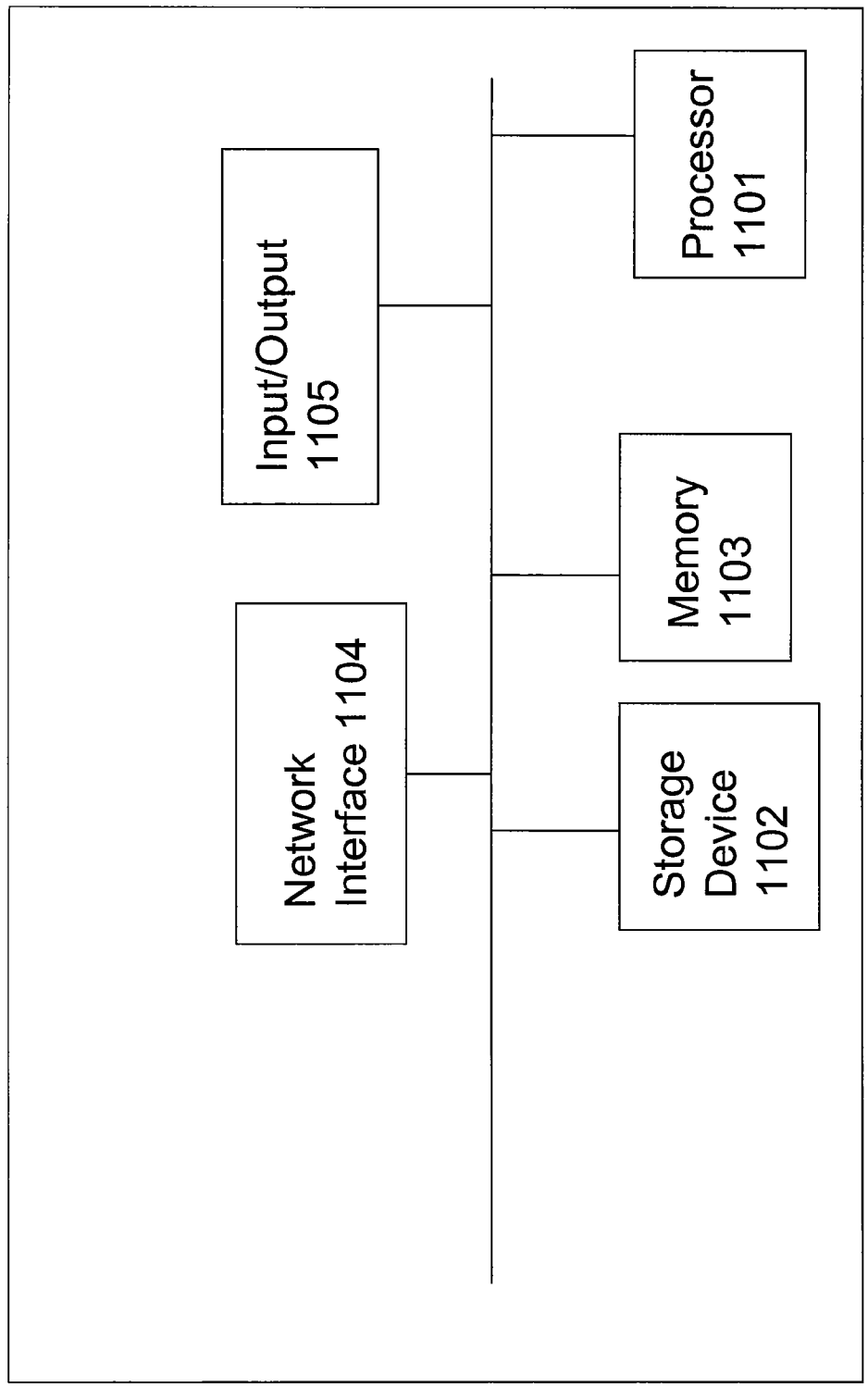

VENDING MODIFIED CLIMATE CONTROL DEVICE

The present application claims the benefit of U.S. Provisional Patent Application Ser. No. 61/418,674, filed Dec. 1, 2010, which is incorporated herein by reference.

TECHNICAL FIELD

This invention is directed to systems, methods, and apparatus for controlling the climate in a local area.

BACKGROUND

Devices that control the climate in an enclosed or open space are an important and necessary part of modern society. In the home and in commercial settings various appliances are used that serve to make an environment more pleasant or comfortable. Traditional appliances that provide climate control include air conditioners, heaters, humidifiers, and similar devices.

In certain environments, a climate control device may be provided that allows visitors to an area to access the climate control device and to vary the climate in the area.

SUMMARY OF THE INVENTION

In accordance with embodiments of the invention, a climate control device and a method for operating a climate control device is provided. A user input comprising a climate control parameter is received. A climate control subsystem that is configured to modify an environment based on the climate control parameter is activated. A payment message that is based on a usage parameter is transmitted to a billing system. The payment message results in a charge being made to an account of the user.

In some embodiments, a request for use of the climate control device is received. An authorization request is transmitted to the billing system in response to receiving the request. In some embodiments an activation message may be received from the billing system. In some embodiments, the activation message is received via a wireless network. In some embodiments, the climate control parameter is selected from the group consisting of: a temperature, a humidity, an ionization/purification and an aroma identifier. In some embodiments, the user input comprises a plurality of climate control parameters and a duration parameter. In some embodiments, a status message comprising a parameter that indicates a quantity of a consumable substance is transmitted. In some embodiments the payment message comprises a usage indication. In some embodiments, a lighting system may be modified.

These and other advantages of the present disclosure will be apparent to those of ordinary skill in the art by reference to the following Detailed Description and the accompanying drawings.

BRIEF DESCRIPTION OF THE DRAWINGS

FIG. 6 shows functional components of a maintenance and monitoring module in accordance with an embodiment;

FIG. 9 shows functional components of a remote monitor in accordance with an embodiment;

FIG. 10 is a flow chart of a method for operating a climate control device in accordance with an embodiment;

FIG. 11 shows components of an exemplary computer that may be used to implement the invention.

DETAILED DESCRIPTION

Figure 1:
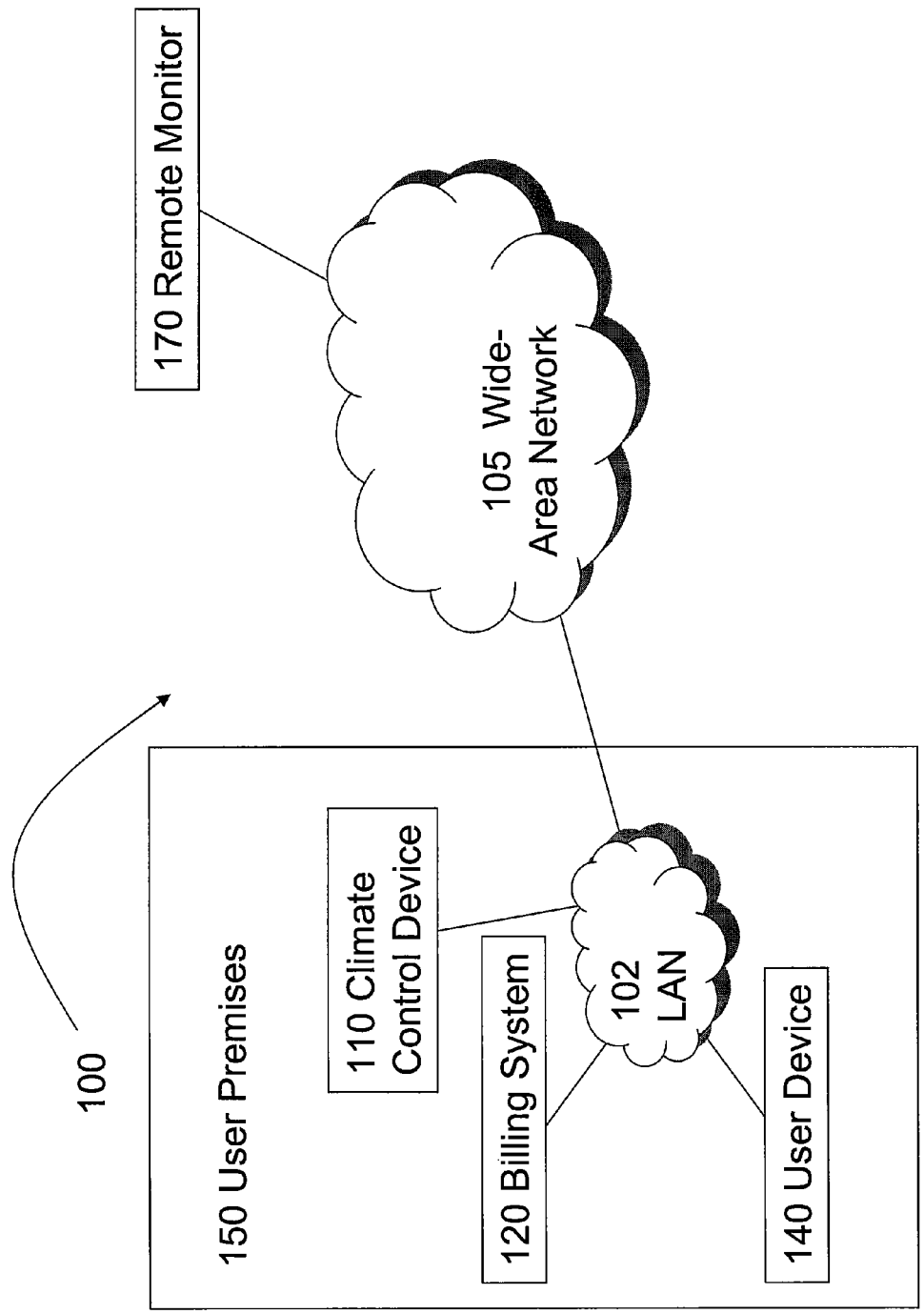
FIG. 1 shows a climate control device, a billing system and a user device connected via a LAN and further connected via a network to a remote monitor in accordance with an embodiment.

In accordance with an embodiment of the invention, a method for operating a climate control device is provided. A user input comprising a climate control parameter is received. A climate control subsystem that is configured to modify an environment based on the climate control parameter is activated. A payment message that is based on a usage parameter is transmitted to a billing system. The payment message results in a charge being made to an account of the user.

In some embodiments, a request for use of the climate control device is received. An authorization request is transmitted to the billing system in response to receiving the request. In some embodiments an activation message may be received from the billing system. In some embodiments, the activation message is received via a wireless network. In some embodiments, the climate control parameter is selected from the group consisting of: a temperature, humidity, an ionization/purification and an aroma identifier. In some embodiments, the user input comprises a plurality of climate control parameters and a duration parameter. In some embodiments, a status message comprising a parameter that indicates a quantity of a consumable substance is transmitted. In some embodiments the payment message comprises a usage indication. In some embodiments, a lighting system may be modified.

An embodiment of the climate control device described herein may allow a user to exercise control over a local environment. In certain embodiments, the climate control device may require a fee from a user in order to function. In certain embodiments such a fee may be collected at the climate control device by inputting currency such as bills or coins. In certain embodiments, such a fee may be collected via a credit card, a gift card, or similar payment device. In certain embodiments such a fee may be collected via a billing system that is connected to an internal system of a facility such as, for example, a hotel billing system.

An embodiment of the climate control device as described herein may function to modify a climate in a local environment. In the foregoing the local environment may be referred to as a room, but it will be understood by one skilled in the art that a climate control device as described herein may control an environment in a variety of different areas such as a room, a particular area within an open space, or a particular area within a larger room. In certain embodiments, a climate control device may be installed in a mobile enclosed space such as an aircraft, an automobile, a railroad car, a boat, a trailer, or similar conveyance. In certain embodiments, the climate control device may control the climate in an enclosed space such as a hotel room. In some embodiments, a climate control device may be used in a home environment, an office environment or another similar space.

In performing the function of controlling a local environment, a climate control device as described herein may include one or more climate control subsystems that operate to vary particular aspects of a local environment. In certain embodiments, the subsystems of the climate control device may control aspects of a local environment such as: temperature, aroma, humidity, ionization/purification of the air, ozone level in the room, sound climate and other environmental factors.

In some embodiments, a climate control device may allow a site manager or local user to remotely monitor the status and functioning of the climate control device. In some embodiments, a climate control device as described herein may be in networked communication via a local area network and/or a wide area network. Network connections to connect to such networks may be, for example, a telephone connection, a wired Internet connection, a wireless connection, or other similar connection methods.

FIG. 1 shows a communication system 100 that may be used to provide online access to services provided by a climate control device, in accordance with an embodiment. Communication system 100 comprises a wide-area network 105, a LAN (local area network) 102, a user premises 150, a climate control device 110, a billing system 120, a user device 140, and a remote monitor 170.

In the exemplary embodiment of FIG. 1, wide-area network 105 is the Internet. In other embodiments, wide-area network 105 or LAN 102 may comprise one or more of a number of different types of networks, such as, for example, an intranet, a local network (LAN), a wide network (WAN), a wireless network, a Fiber Channel-based storage network (SAN), or Ethernet. Other networks may be used. Alternatively, wide-area network 105 or LAN 102 may comprise a combination of different types of networks.

Figure 2:
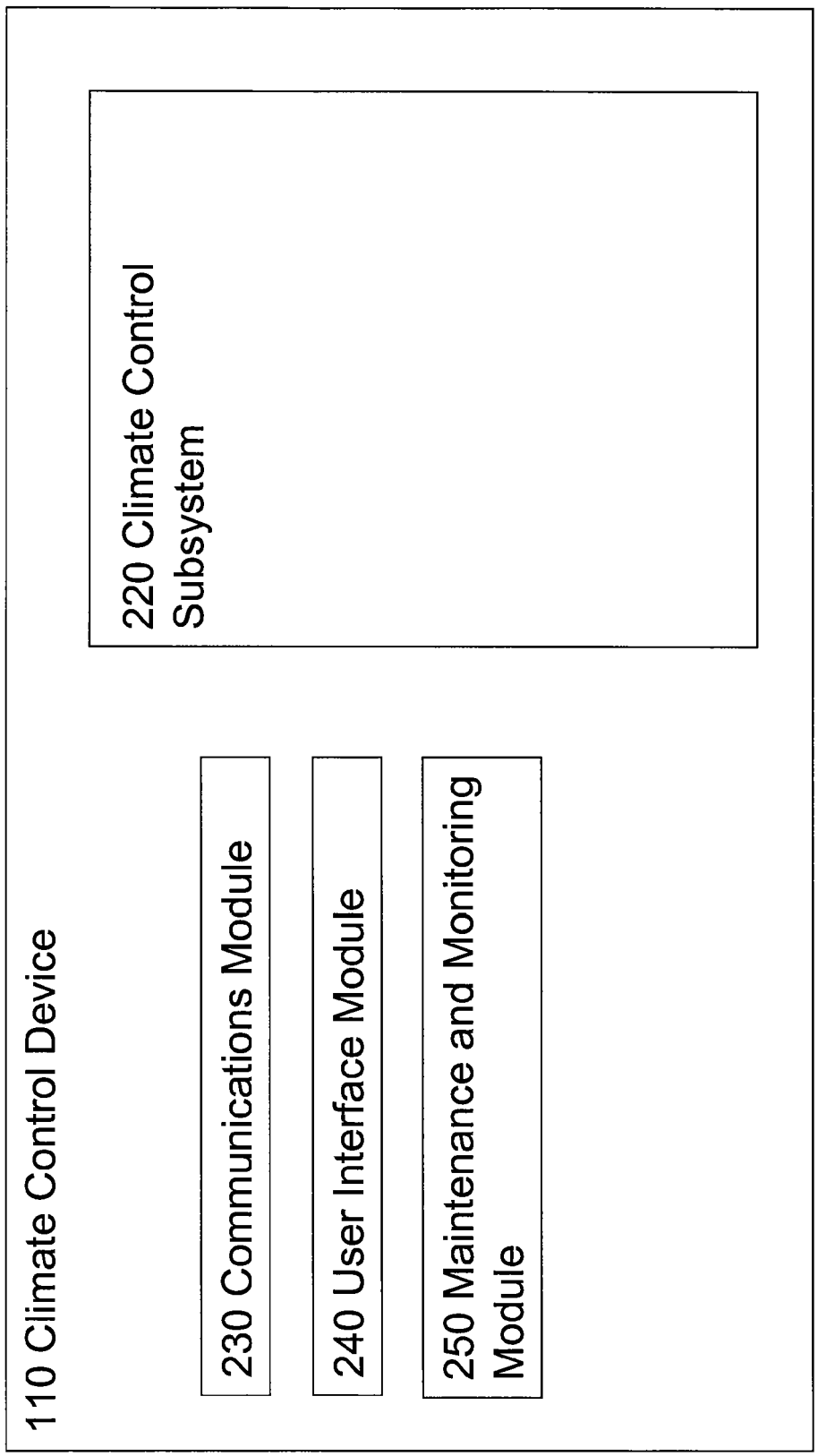
FIG. 2 shows functional components of an exemplary climate control device in accordance with an embodiment.

FIG. 2 shows functional components of a climate control device 110 in accordance with an embodiment. Climate control device 110 comprises a communications module 230, a user interface module 240, maintenance and monitoring module 250, and a climate control subsystem 220. Communications module 230 may be a network interface that provides connectivity for climate control device 110 to wide-area network 105 and LAN 102. User interface module 240 provides functionality that allows a user of climate control device 110 to interact with the climate control device. For example, user interface module 240 may comprise a display and buttons that allow a user to input data to climate control device 110 and to receive data from climate control device 110. Maintenance and monitoring module 250 provides monitoring of aspects of climate control device 110. Maintenance and monitoring module 250 may provide logging and issue detection functionality that can be used to determine the previous and current state of the functioning of climate control device 110 and its subsystems. Issue detection functionality may be, for example, an alarm system that provides an alert and, in certain embodiments, a response to particular condition of climate control device 110 or its components. Climate control subsystem 220 provides an interface that may accept various modules that may function to control a local environment.

In an embodiment, climate control subsystem 220 may accept various modules that may be connected into climate control device 110. Climate control subsystem 220 includes a physical connection for one or more modules and an interface that allows such modules to communicate with components of climate control subsystem 110. In an embodiment, examples of modules that may connect with climate control subsystem 220 include: a fan module that can move air in the environment of climate control device 110, a humidifier/dehumidifier module that can change the humidity in the environment of climate control device 110, an ionizer module that can ionize the air in the environment of climate control device 110 and other modules that may be used to change an environment in an area.

Figure 3:
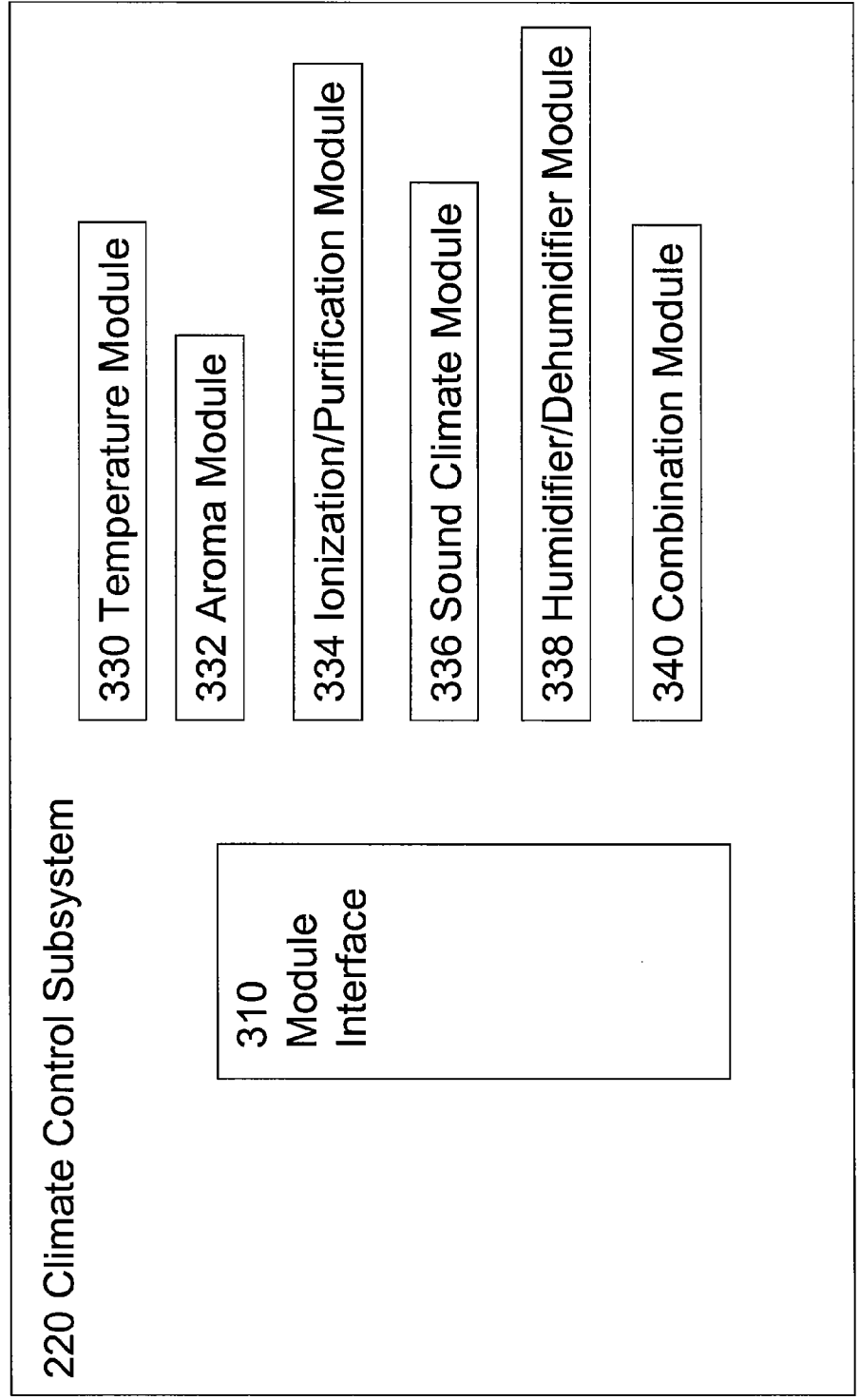
FIG. 3 shows functional components of a climate control subsystem in accordance with an embodiment.

FIG. 3 shows functional components of a climate control subsystem 220 in accordance with an embodiment. Climate control subsystem 220 comprises a module interface 310 and a variety of different climate control modules. Examples of climate control modules may include: a temperature module 330, an aroma module 332, an ionization/purification module 334, a sound climate module 336, and a humidifier/dehumidifier module 338. In an embodiment each module may include one or more sensors that may detect device conditions and environment factors related to climate control device 110. In certain embodiments, each module connected with climate control subsystem 220 may change its output in response to changes detected by sensors related to climate control device 110.

In certain embodiments climate control subsystem 220 may be connected to one or more sources of consumable materials. For example, climate control subsystem 220 may include or may be connected to a water source or to a reservoir of water for use with humidifier/dehumidifier module 338. Climate control subsystem 220 may include or be connected to a source of consumables such as a source of perfumed material for use with aroma module 332.

In an embodiment, temperature module 330 may comprise a heating element and a fan to drive warm air from the heating element into the area in the vicinity of climate control device 110. In an embodiment temperature module 330 may comprise a cooling element such as a heat pump or an air conditioning unit. In an embodiment heating element 330 may comprise other devices that may impact a temperature in an area in the vicinity of climate control device 110. In an embodiment, temperature module 330 may include a thermocouple or a thermometer to determine a temperature in a vicinity of climate control device 110. In an embodiment, temperature module 330 may comprise a system that monitors a current status of a consumable, for example a refrigeration fluid that may be consumed during operation of temperature module 330.

In an embodiment, aroma module 332 may include an aroma producing system and an air moving system to drive the produced aroma into the vicinity of climate control device 110. For example, in certain embodiments, aroma module 332 may include a perfume container that may be unsealed when aroma module 332 receives an activation signal or is otherwise triggered into operation. In certain embodiments, aroma module 332 may include a heating element that heats a perfume container in order to cause the perfume container to release one or more aromas. In an embodiment aroma module 332 may enter "no aroma" mode. In "no aroma" mode, aroma module 332 may take in air from the vicinity of climate control device 110 and process it through a de-odorizer unit in order to remove aroma from air in the vicinity of climate control device 110.

In an embodiment, ionization/purification module 334 may include an ionizer and/or an air purifier device. Air purifier devices and air ionizer devices may be included as part of climate control module 220 at the time of installation or may be added after installation of climate control device 110.

In an embodiment, sound climate module 336 may include an audio speaker. In an embodiment sound climate module 336 may include audio recordings. In certain embodiments, sound climate module 336 may include audio records such as electronic sound files or compact disks that may be selected by a user to generate certain sounds to be heard in the environment or area of climate control device 110. In an embodiment, sound climate module 336 may generate white noise to be heard in the area of climate control module 110.

In an embodiment, humidifier/dehumidifier module 338 may include a system to add or remove humidity to the air in the area of climate control device 110. In an embodiment humidifier/dehumidifier module 338 may also include a device to increase or to decrease the amount of ionization and/or purification in the air in the vicinity of climate control device 110.

Climate control subsystem 220 may include a combination module 340. A combination module may interface with a plurality of modules within climate control subsystem 220 in order to provide simultaneous and/or concerted functionality. In an embodiment, combination module 340 may receive one or more climate control parameters or a climate control program. In response to the one or more climate control parameters or a climate control program, combination module 340 may cause one or more modules of climate control subsystem 220 to function consecutively or in parallel. For example, in an embodiment, a combination module 340 may communicate with a temperature module to maintain a particular temperature for a period of time such as one hour.

Figure 4:
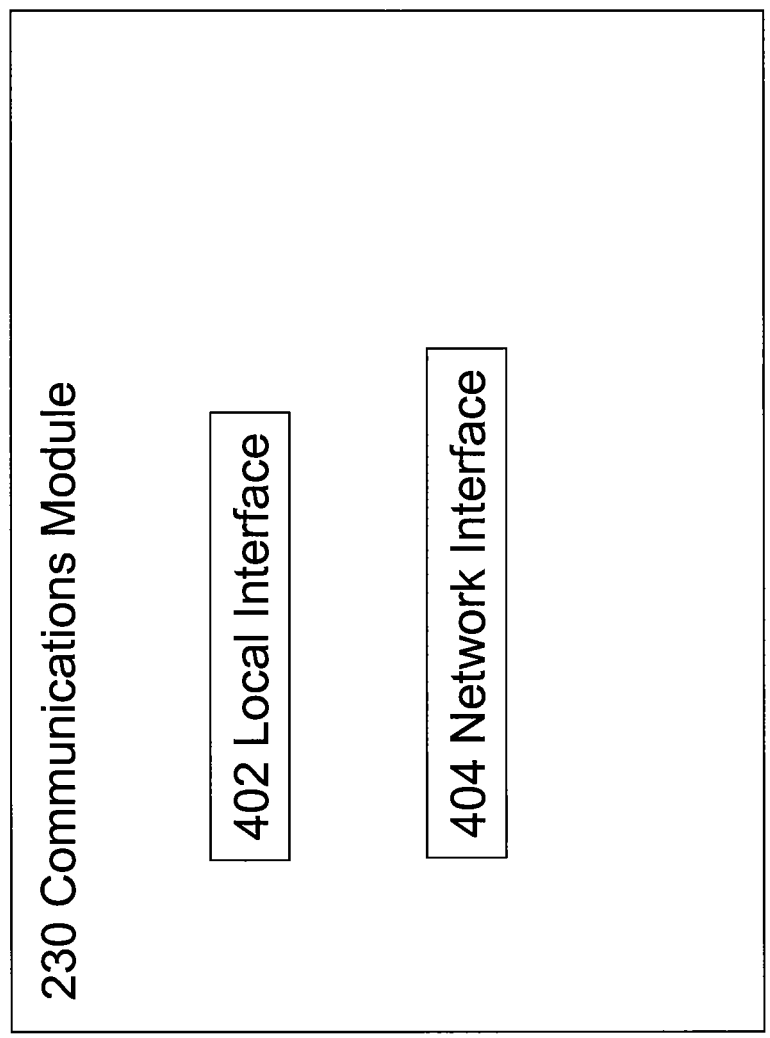
FIG. 4 shows functional components of a communications module in accordance with an embodiment.

FIG. 4 shows functional components of a communications module 230 in accordance with an embodiment. Communications module 230 may comprise a local interface 402 and a network interface 404. Communications module 230 may receive and transmit information via network interface 404 through LAN 102 and wide-area network 105. Communications module 230 may also receive and transmit data via local interface 402 to and from user interface module 240. Communications module 230 may also receive and transmit data to and from other components of climate control device 110. In an embodiment communications module 230 may comprise a web server that allows a user to communicate with climate control device 110 via a web page that may be accessed from a computer, a handheld device, a phone or other similar devices.

Figure 5:
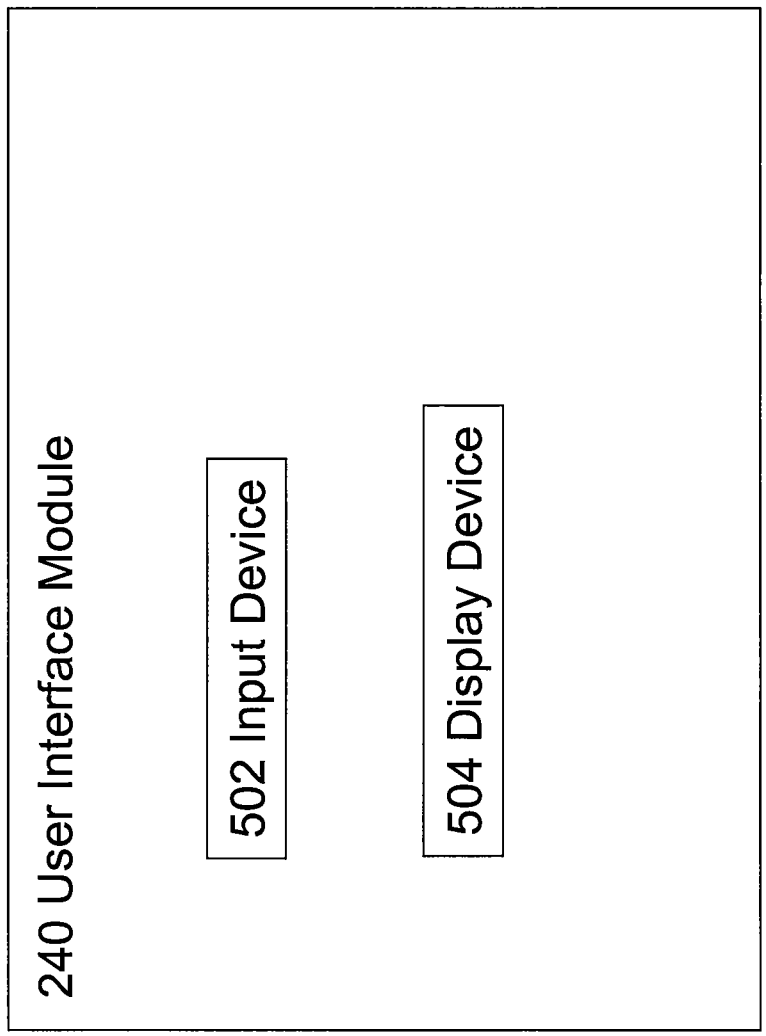
FIG. 5 shows functional components of a user interface module in accordance with an embodiment.

FIG. 5 shows functional components of a user interface module 240 in accordance with an embodiment. User interface module 240 includes an input device 502 and a display device 504. In an embodiment, user interface module 240 may receive and transmit data via communications module 230. For example, in an embodiment, a user of a climate control device 110 may access communications module 230 via a web page that displays information about climate control device 110 and allows a user to input data to climate control device 110. User interface module 240 may include an interface to accept coins or bills via input device 502. User interface module 240 may include an interface to receive payment via a credit card or similar device via input device 502. User interface module 240 may present information related to the state of climate control device 110 via display device 504.

FIG. 6 shows functional components of maintenance and monitoring module 250 in accordance with an embodiment. Maintenance and monitoring module 250 may comprises a device order database subsystem 610, a troubleshooting diagnostics subsystem 611, a performance subsystem 612, a data management and reporting subsystem 613, a user interface subsystem 614, a networking subsystem 615, a fan performance subsystem 616, an electronic operating logs subsystem 617, a monitoring subsystem 618, and a climate control subsystem 619. For example, in an embodiment, maintenance and monitoring module 250 may interface with all or some of the above listed subsystems. In an embodiment certain modules included in FIG. 6 may or may not be included in maintenance and monitoring module 250. In certain embodiments additional subsystems may be included in addition to those indicated in FIG. 6.

In certain embodiments device order database subsystem 610 may be included in maintenance and monitoring module 250. Device order database subsystem 610 records information relating to the status of climate control device 110. Information recorded in device order database subsystem 610 may include, for example, quantity of current billing charges, history of billing charges, climate control parameters currently in use, climate control parameters that have been used in the past, state information regarding climate control device 110, history information regarding climate control device 110, and other information relevant to the functioning of climate control device 110.

In certain embodiments troubleshooting diagnostics subsystem 611 may be included in maintenance and monitoring module 250. Troubleshooting diagnostics subsystem 611 performs certain functions that can be used to evaluate the functionality of climate control device 110. Troubleshooting diagnostics subsystem 611 may transmit information to device order database subsystem 610, monitoring subsystem 618, and other subsystems of maintenance and monitoring module 250 depending on the status of climate control device 110, inputs to climate control device 110, and information detected by sensors associated with climate control device 110.

In certain embodiments performance subsystem 612 may be included in maintenance and monitoring module 250. Performance subsystem 612 performs certain functions that can be used to evaluate the performance of climate control device 110. Performance subsystem 612 may transmit information to device order database subsystem 610, monitoring subsystem 618, remote monitor 170, and other subsystems depending on the status of climate control device 110.

In certain embodiments data management and reporting subsystem 613 may be included in maintenance and monitoring module 250. Data management and reporting subsystem 613 performs certain functions that can be used to process the data received by the sensors and generated by different components of climate control device 110. Data management and reporting subsystem 613 may transmit information to device order database subsystem 610, monitoring subsystem 618, and other subsystems depending on the status of climate control device 110.

In certain embodiments user interface subsystem 614 may be included in maintenance and monitoring module 250. User interface subsystem 614 communicates with user interface module 240 of climate control device 110. User interface subsystem 614 may communicate messages to and from user device 140 and remote monitor 170 to allow messages to be received and transmitted from maintenance and monitoring module 250.

In certain embodiments networking subsystem 615 may be included in maintenance and monitoring module 250. Networking subsystem 615 is connected to communications module 230. Networking subsystem 615 allows networked access via wide-area network 105 and LAN 102 to and from maintenance and monitoring module 250. In certain embodiments, networking subsystem 615 may allow networked access to maintenance and monitoring module 250 when other communications subsystems of climate control device 110 are malfunctioning.

In certain embodiments fan performance subsystem 616 may be included in maintenance and monitoring module 250. Fan performance subsystem 616 communicates with climate control subsystem 220 to record information of a fan or a plurality of fans that may be included in climate control subsystem 220.

In certain embodiments electronic operating logs subsystem 617 may be included in maintenance and monitoring module 250. Electronic operating logs subsystem 617 communicates with various electronic components within climate control device 110. Electronic operating logs subsystem 617 may log information relating to status of climate control device 110. Information logged by electronic operating logs subsystem 617 may be communicated to other subsystems and modules of climate control device 110 or to external devices.

In certain embodiments monitoring subsystem 618 may be included in maintenance and monitoring module 250. Monitoring subsystem 618 may record information from sensors included in climate control device 110. Information received by monitoring subsystem 618 may be communicated with other subsystems of maintenance and monitoring module 250 or external modules.

In certain embodiments climate control subsystem 619 may be included in maintenance and monitoring module 250. Climate control subsystem 619 may provide an interface between maintenance and monitoring module 250 and climate control subsystem 220.

Figure 7:
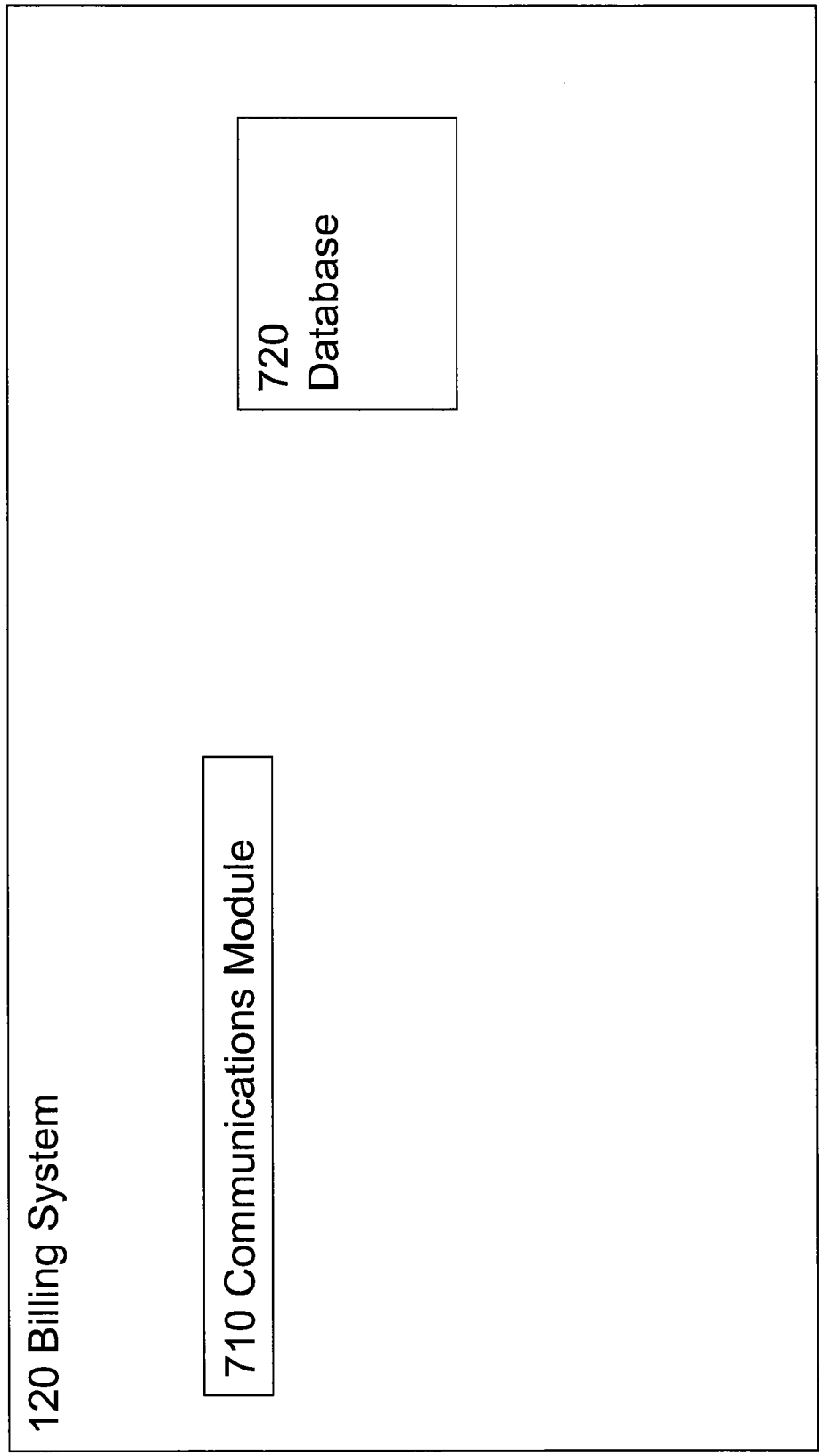
FIG. 7 shows functional components of a billing system in accordance with an embodiment.

FIG. 7 shows functional components of a billing system 120 in accordance with an embodiment. Billing system 120 comprises a communications module 710 and a database 720. In an embodiment, billing system 120 receives and transmits data to user interface module 240 of climate control device 110. Billing system 120 also may receive and transmit data to communications module 230 of climate control device 110. In an exemplary embodiment billing system 120 receives and records information relating to usage of climate control device 110. In an exemplary embodiment billing system 120 receives information related to payments made for usage of climate control device 110 via communications module 710 and records such information in database 720. It should be noted that although FIG. 1 shows billing system 120 located within user premises 150, in certain embodiments billing system 120 may be at a location remote from user premises 150. For example, in certain embodiments billing system 120 may communicate with climate control device 110 via wide-area network 105.

Figure 8:
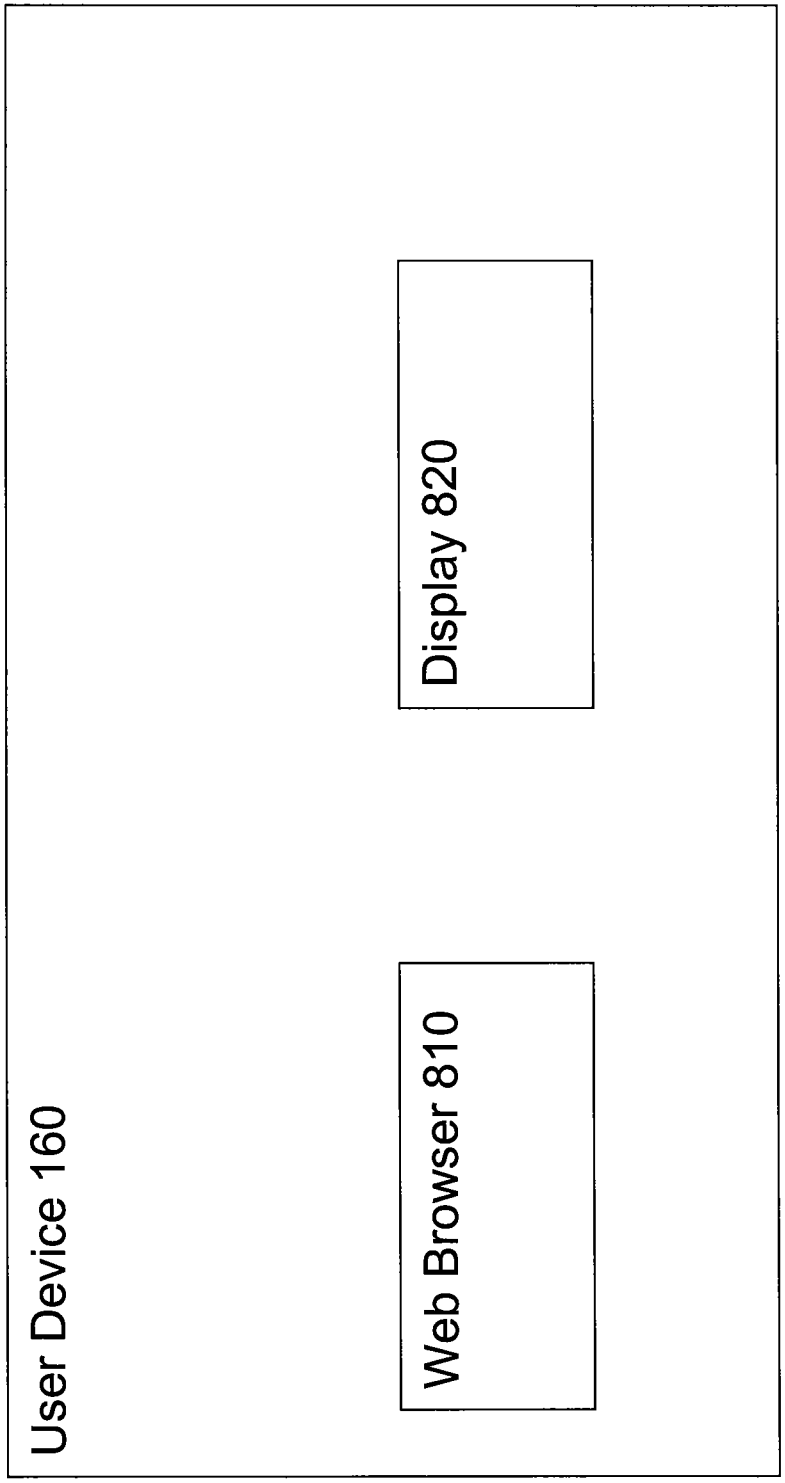
FIG. 8 shows functional components of a user device in accordance with an embodiment.

FIG. 8 shows functional components of a user device 160 in accordance with an embodiment. User device 160 comprises a web browser 810 and a display 820. Web browser 810 may be a conventional web browser used to access World Wide Web sites via the Internet, for example. Display 820 displays text, graphics, Web pages, and other information to a user. For example, a set of climate control parameters that a user may select for input to climate control device 110 may be displayed on display 820. User device 160 may be any device that enables a user to communicate via wide-area network 105 or LAN 102. User device 160 may be connected to wide-area network 105 or LAN 102 through a direct (wired) link, or wirelessly. User device 160 may have a display screen for displaying information. For example, user device 160 may be a personal computer, a laptop computer, a workstation, a mainframe computer, etc. Alternatively, user device 160 may be a mobile communication device such as a wireless phone, a personal digital assistant, etc. Other devices may be used.

Figure 9:
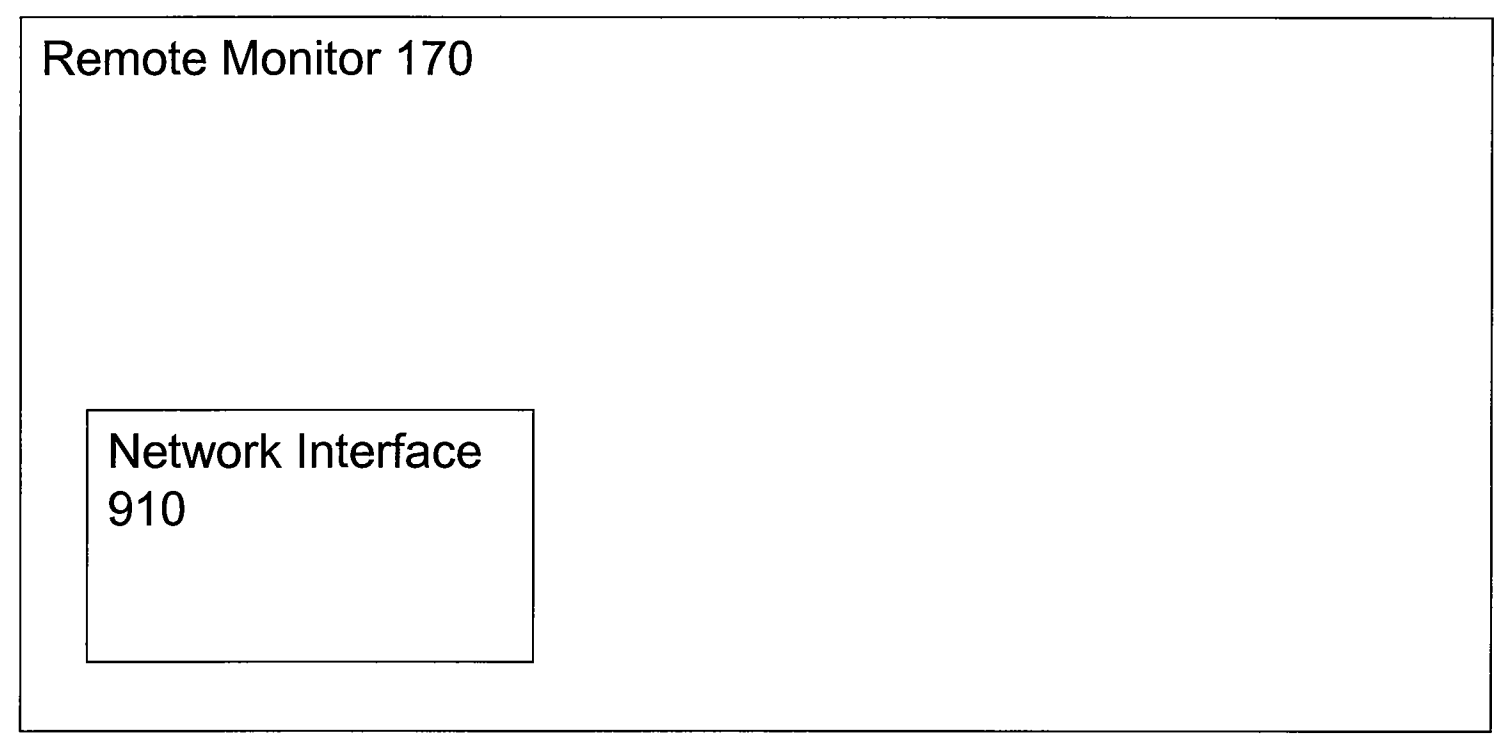

FIG. 9 shows functional components of a remote monitor 170 in accordance with an embodiment. In an embodiment, remote monitor 170 may be any device that enables a user to communicate via wide-area network 105. Remote device 170 comprises a network interface 910 for connecting to wide-area network 105. Remote monitor 170 may be connected to wide-area network 105 through a direct (wired) link via network interface 910, or wirelessly via network interface 910. In an exemplary embodiment remote monitor 170 may communicate with one or more climate control devices at various locations in order to transmit information to one or more climate control devices and/or to receive data from one or more climate control devices. Remote monitor 170 may transmit software updates or other information to climate control device 110 via network interface 910. Remote monitor 170 may receive information regarding performance and functionality from climate control device 110.

FIG. 10 is a flow chart of a method for controlling an environment in an area in accordance with an embodiment.

At optional step 1010, an activation message is received. Optional step 1010 may be included in certain embodiments of the present disclosure. In an illustrative embodiment, an activation message is received at climate control device 110. In certain embodiments, the activation message is received via user interface module 240. For example, a user may slide a credit card into a slot on user interface module 240 In certain embodiments, the activation message is received via communication module 230. For example, an activation message may be sent from billing system 120 to climate control device 110 in response to a phone call from a user to a front desk authorizing payment for use of climate control device 110. In certain embodiments the activation message may be received as a result of a payment being made via user interface 240. In certain embodiments the activation may be received as a result of an authorization being made via billing system 120.

In certain embodiments, in response to receiving an activation message, climate control device 110 may provide a prompt via user interface module 240 to alert a user that climate control device 110 is ready to receive climate control parameters. In certain embodiments, in response to receiving the activation message, climate control device 110 may transmit a signal via LAN 102 or wide-area network 105 that climate control device 110 is ready to receive climate control parameters. In response to the signal climate control device 110 may receive climate control parameters from an external device such as user device 140, billing system 120, or remote monitor 170. For example, the user may access climate control device 110 over LAN 102 by opening a web page that provides access to climate control device 110 via communications module 230.

At step 1020, a user input comprising a climate control parameter is received. In the illustrative embodiment, a user input comprising a climate control parameter is received at climate control device 110. In certain embodiments, the user input is received via user interface 240.

In certain embodiments the user input may comprise a plurality of climate control parameters that may be used to trigger several of the modules of climate control subsystem 220 either simultaneously or in succession or in combination. In certain embodiments the climate control parameters may comprise a plurality of times, durations, set values for climate control parameters and range values for climate control parameters. Such a set of climate control parameters may constitute a climate control program. A climate control program comprises a set of parameters for input to climate control device 110. The parameters of an exemplary climate control program may specify one or more climate control parameters that vary within a specified range of a set value over a specified time period.

In an embodiment, climate control device 110 will process the climate control program so that sensors within climate control device 110 may monitor for changes in the environment of climate control device 110 in order to detect if a particular parameter from a specified set of climate control parameters is within a range specified by the climate control program. Table 1 illustrates a set of climate control parameters as may be used in an exemplary embodiment of climate control device 110.

TABLE 1

| Climate Aspect | Climate Set value | Climate Value Range | Start Time (24-Hour Cock) | Duration (Hours) | Additional Parameter |
|---|---|---|---|---|---|
| Temperature | 65 degrees | +−2 degrees | 22:00 | 8 | |
| Light | Dim | — | 22:00 | 8 | — |
| Sound | Soft | — | | 8 | Whale Sound |
| Aroma | Strong | Strong-Medium | 23:00 | 7 | Sandlewood |
| Light | Medium | — | 6:00 | 3 | — |
| Sound | Soft | — | 6:00 | 3 | Jazz 1 |
| Aroma | No Aroma | Zero-Light | 6:00 | 3 | — |
| Ionizier | Full Ionization | Full-Medium | 9:00 | 15 | |
| Light | Bright | | 9:00 | 15 | |
| Temperature | 75 degrees | +−2 degrees | 9:00 | 15 | |

In an embodiment, a facility in which a climate control device is installed may have one or more predefined climate control programs available to users that are suitable for operating climate control device 110 with a particular set of climate control modules connected to climate control subsystem 220. For example, a climate control program that controls an environment to provide relief from the effects of jetlag or seasonal affective disorder or other illness may be developed and provided to a user as an option via user interface module 240. In an embodiment, a climate control program may be provided to assist a user in establishing, maintaining or relieving or altering a particular state of a user such as tired, depressed, and cheerful or another mood may be provided.

At step 1030, climate control subsystem 220 that is configured to modify an environment based on the climate control parameter is activated. In an embodiment where the user input comprises a plurality of climate control parameters various modules of climate control subsystem 220 are activated. In an embodiment where the user input comprises a climate control program, module interface 310 of climate control subsystem 220 may process the program in order to determine the order of operation of the modules of climate control module 220. Module interface 310 can interact with sensors to determine whether a response of one of the modules of climate control module 220 should vary its response in order to maintain a particular climate control parameter within a specified range.

At step 1040, a payment message is transmitted to billing system 120 based on a usage parameter, where the payment message results in a charge to an account of the user. In an embodiment the payment message results in a charge being made to an account of a user of climate control device 110. In an embodiment of climate control device 110, to which a user wishes to input coins or bills via user interface module 240, the transmission of the payment message may result in a charge to a user being determined and an amount of change being returned to the user. When a payment message is received information relating to the climate control parameters and the payment message may be recorded by maintenance and monitoring module 250 and billing system 120.

In certain embodiments, the billing message transmits the activation message to climate control device 110. After the usage of climate control device 110 has been completed, climate control device 110 may transmit a payment message to billing system 120. In certain embodiments, the payment message may comprise data regarding the type of usage, amount of usage and duration of usage of climate control device 110. In certain embodiments a user makes a request to use climate control device 110, the request may be made via an external device such as a web browser, via user interface module 240, via remote monitor 170 or via another device which communicates with climate control device 110.

In certain embodiments, climate control device 110 may communicate a status message that comprises information relating to a status of climate control device 110. The status message may, for example be generated by maintenance and monitoring module 250 based on information stored in electronic operating logs subsystem 617, or another subsystem of maintenance and monitoring module 250. In an embodiment the status message may comprise information relating to a quantity of a consumable, for example a number of quarts of water, an amount of perfumed material, a state (e.g. clean or dirty) of air cleaning filter, or other consumables. In certain embodiments the status message may comprise a warning that a quantity of a consumable is too high or too low.

In an embodiment climate control device 110 may comprise an interface that allows it to access, control and interoperate with an external device that may be used to alter or control an environment in which a climate control device 110 operates. For example, in an embodiment, climate control device 110 may connect with a device in an area such as a window shade control. A window shade control may be, for example a device that changes a tint in a window in order to vary the amount of light that enters an area. A window shade control may also be a device that controls whether a window shade is up or down or a set of blinds on a window are open or closed. Other examples of external devices that may transmit to, and receive commands and information from climate control device 110 include, for example, a heating unit, a stereo system, an alarm clock, a television, or other components that may be associated with an area. In an embodiment, climate control device 110 may cause external devices to which it is connected to act according to a climate control program that has been received into climate control device 110.

In an exemplary usage scenario in accordance with this disclosure, suppose a user stays at a hotel room that utilizes climate control device 110. Upon checking in to the hotel the user specifies that expenses related to the use of climate control device 110 in his hotel room be charged to his hotel bill on a per night stay basis. Once climate control device 110 receives an activation message, the user accesses user interface module 240 via a web page that connects to climate control device via LAN 102. Via the web page the user specifies a set of climate control parameters for his room. When climate control device 110 receives the climate control parameters, they are stored by maintenance and monitoring module 250 and transmitted to the billing system 120 and remote monitor 170.

Climate control subsystem 220 processes the received climate control parameters and causes the climate control device 110 to begin controlling the environment. For example, supposing that the received climate control parameters are a particular humidity and a particular temperate, the appropriate modules of climate control subsystem are triggered to begin functioning. At the time that the climate control device begins controlling the environment, the climate control device 110 activates sensors to determine whether the environment conditions at the time of activation meet the requested climate control parameter specified conditions. In typical operation the environment in the area of climate control device 110 may not satisfy the conditions specified by the climate control parameters. Under those conditions, the sensors of the climate control device determine the difference between the environment as sensed and conditions specified by the climate control parameters. Based on that determined difference, the modules of the climate control device 110 operate to alter the environment to meet the conditions specified. Thereafter, the climate control device 110 periodically detects the environment to determine whether conditions have changed, and/or if the response of the modules of the climate control subsystem 220 should be altered.

Supposing that the climate control parameters specified in an input climate control program have been met, climate control device 110 deactivates. In response to the deactivation, state information may be recorded and transmitted to billing system 120 and remote monitor 170. Climate control device 110 may also calculate a usage fee associated with the use of climate control device 110, and transmit that information to the user interface and/or to billing system 120.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 10. Certain steps of the methods described herein, including one or more of the steps of FIG. 10, may be performed by a server or by another processor in a network-based cloud-computing system. Certain steps of the methods described herein, including one or more of the steps of FIG. 10, may be performed by a client computer in a network-based cloud computing system. The steps of the methods described herein, including one or more of the steps of FIG. 10, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 10, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A high-level block diagram of an exemplary computer that may be used to implement systems, apparatus and methods described herein is illustrated in FIG. 11. Computer 1100 comprises a processor 1101 operatively coupled to a data storage device 1102 and a memory 1103. Processor 1101 controls the overall operation of computer 1100 by executing computer program instructions that define such operations. The computer program instructions may be stored in data storage device 1102, or other computer readable medium, and loaded into memory 1103 when execution of the computer program instructions is desired. Thus, the method steps of FIG. 10 can be defined by the computer program instructions stored in memory 1103 and/or data storage device 1102 and controlled by the processor 1101 executing the computer program instructions. For example, the computer program instructions can be implemented as computer executable code programmed by one skilled in the art to perform an algorithm defined by the method steps of FIG. 10. Accordingly, by executing the computer program instructions, the processor 1101 executes an algorithm defined by the method steps of FIG. 10. Computer 1100 also includes one or more network interfaces 1104 for communicating with other devices via a network. Computer 1100 also includes one or more input/output devices 1105 that enable tester interaction with computer 1100 (e.g., display, keyboard, mouse, speakers, buttons, etc.).

Processor 1101 may include both general and special purpose microprocessors, and may be the sole processor or one of multiple processors of computer 1100. Processor 1101 may comprise one or more central processing units (CPUs), for example. Processor 1101, data storage device 1102, and/or memory 1103 may include, be supplemented by, or incorporated in, one or more application-specific integrated circuits (ASICs) and/or one or more field programmable gate arrays (FPGAs).

Data storage device 1102 and memory 1103 each comprise a tangible non-transitory computer readable storage medium. Data storage device 1102, and memory 1103, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1105 may include peripherals, such as a printer, scanner, display screen, etc. For example, input/output devices 1105 may include a display device such as a cathode ray tube (CRT) or liquid crystal display (LCD) monitor for displaying information to the user, a keyboard, and a pointing device such as a mouse or a trackball by which the user can provide input to computer 1100.

Any or all of the systems and apparatus discussed herein, including climate control device 110, billing system 120, user device 140, remote monitor 170 and components thereof, including input device 502, display device 504, climate control module 220, communications module 230, and maintenance and monitoring module 250, may be implemented using a computer such as computer 1100.

One skilled in the art will recognize that an implementation of an actual computer or computer system may have other structures and may contain other components as well, and that FIG. 11 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for operating a climate control device comprising:
   receiving, at the climate control device, a request for use of the climate control device;
   transmitting an authorization request to a billing system in response to receiving the request;
   receiving an activation message from the billing system in response to the authorization request;
   receiving a user input identifying a climate control program comprising a temperature parameter, a humidity parameter, an ionization parameter, a dehumidifier parameter, an air purification parameter, a sound parameter, and an aroma parameter, each of the parameters associated with a respective one of a plurality of times, a plurality of durations, and a plurality of set values;
   sensing a condition of the environment;
   determining a difference between the condition of the environment and a parameter of the climate control program;
   operating a climate control subsystem to modify the environment based on the determining; and
   transmitting a payment message to the billing system based on a plurality of usage parameters;
   wherein the payment message results in a charge to an account of the user.

2. The method of claim 1, wherein the payment message is transmitted via a wireless network.

3. The method of claim 1, further comprising:
   transmitting a status message indicating a quantity of a perfumed material.

4. The method of claim 1, wherein the payment message comprises a plurality of usage indications.

5. The method of claim 1, further comprising:
   modifying a lighting system.

6. A climate control device comprising:
   a network interface configured to:
   receive a request for use of the climate control device;
   transmit an authorization request to a billing system in response to receiving the request;
   receive an activation message comprising information associated with the billing system in response to the authorization request;
   transmit a payment message to the billing system based on a plurality of usage parameters, wherein the payment message results in a charge to an account of a user;
   a user interface configured to:
   receive a user input identifying a climate control program comprising a temperature parameter, a humidity parameter, an ionization parameter, a dehumidifier parameter, an air purification parameter, a sound parameter, and an aroma parameter, each of the parameters associated with a respective one of a plurality of times, a plurality of durations, and a plurality of set values; and
   a climate control subsystem configured to:
   sense a condition of the environment;
   determine a difference between the condition of the environment and a parameter of the climate control program;
   modify an environment based on the difference climate control program.

7. The climate control device of claim 6, wherein the network interface is further configured to transmit the payment message via a wireless network.

8. The climate control device of claim 6, wherein the network interface is further configured to:
   transmit a status message indicating a quantity of a perfumed material.

9. The climate control device of claim 6, wherein the payment message comprises a plurality of usage indications.

10. The climate control device of claim 6, wherein the climate control subsystem is further configured to modify a lighting system.

11. An apparatus for controlling a climate comprising:
    a processor; and
    a memory to store computer program instructions, the computer program instructions when executed on the processor cause the processor to perform operations comprising:
    receiving a request for use of the climate control device;
    transmitting an authorization request to a billing system in response to receiving the request;
    receiving an activation message in response to the authorization request, wherein the activation message comprises information associated with the billing system;
    receiving a user input identifying a climate control program comprising a temperature parameter, a humidity parameter, an ionization parameter, a dehumidifier parameter, an air purification parameter, a sound parameter, and an aroma parameter, each of the parameters associated with a respective one of a plurality of times, a plurality of durations, and a plurality of set values;
    sensing a condition of the environment;
    determining a difference between the condition of the environment and a parameter of the climate control program;
    operating a climate control subsystem to modify the environment based on the determining; and transmitting a payment message to the billing system based on a plurality of usage parameters;

wherein the payment message results in a charge to an account of the user.

12. The apparatus of claim 11, wherein the transmitting a payment message comprises transmitting a wireless communication.

13. The apparatus of claim 1, further comprising:

transmitting a status message indicating a quantity of a perfumed material.

14. The apparatus of claim 11, wherein the payment message comprises a plurality of usage indications.

15. The apparatus of claim 11, wherein the activating the climate control subsystem further comprises modifying a lighting system.

* * * * *

UNITED STATES PATENT AND TRADEMARK OFFICE
CERTIFICATE OF CORRECTION

Page 1 of 1

PATENT NO. : 9,188,443 B2
APPLICATION NO. : 13/306296
DATED : November 17, 2015
INVENTOR(S) : Michael Gordon et al.

It is certified that error appears in the above-identified patent and that said Letters Patent is hereby corrected as shown below:

In the Claims

Claim 6, column 14, lines 30-31, "modify an environment based on the difference climate control program." should read -- modify an environment based on the difference. --

Signed and Sealed this
Twenty-sixth Day of April, 2016

Michelle K. Lee
*Director of the United States Patent and Trademark Office*